US006400311B1

(12) United States Patent
Kolbli et al.

(10) Patent No.: US 6,400,311 B1
(45) Date of Patent: Jun. 4, 2002

(54) RADAR RANGEFINDER

(75) Inventors: Bertram Kolbli, Frankfurt; Peter Lolkes, Maintal; Axel Konig, Freigericht; Theodor Ohl, Kahl, all of (DE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/647,119

(22) PCT Filed: Mar. 23, 1999

(86) PCT No.: PCT/EP99/01979

§ 371 (c)(1),
(2), (4) Date: Dec. 19, 2000

(87) PCT Pub. No.: WO99/50686

PCT Pub. Date: Oct. 7, 1999

(30) Foreign Application Priority Data

Mar. 27, 1998 (DE) .......................... 198 13 631

(51) Int. Cl.[7] .......................... G01S 13/08; G01S 7/40
(52) U.S. Cl. .................. 342/128; 342/118; 342/165; 342/173; 342/174

(58) Field of Search .................. 342/118, 121, 342/122, 123, 124, 165, 169, 170–175, 128–130

(56) References Cited

U.S. PATENT DOCUMENTS 4,245,221 A * 1/1981 Kipp et al. .................. 342/128

FOREIGN PATENT DOCUMENTS

GB 2105942 A * 3/1983 ............. G01S/7/40

* cited by examiner

*Primary Examiner*—Bernarre Gregory
(74) *Attorney, Agent, or Firm*—Dennis C. Bremer

(57) ABSTRACT

The inventive radar rangefinder has a transmitting/receiving antenna (22) for surveying a danger area. Said antenna is located in a radome housing (12), on a rotatable platform (18). A reflector is placed at a known distance in order to calibrate the device. This reflector is formed by an auxiliary antenna (24) with a connected delay line (26) inside the randome housing (12). The length of the virtual distance of the reflector produced then corresponds to the velocity factor of the delay line used.

11 Claims, 3 Drawing Sheets

RADAR RANGEFINDER

The present invention relates to a radar rangefinder as claimed in the descriptive part of patent claim 1.

Such a radar rangefinder is used, for example, in an arrangement for monitoring a danger area, as is illustrated and described in DE 196 12 579 A1 from the same applicant.

In the FMCW radar (frequency-modulated continuous-wave radar) used there, temperature-dependent and age-dependent changes normally prevent a desired strictly linear frequency/time function. The voltage-controlled oscillators in the available transmitters have non-linear drive characteristics which are highly dependent on temperature, load and the operating voltage.

In this context, it is known for calibration methods to be used, which use a target which produces an echo at a known distance. This allows self-calibration to be carried out, using the Hilbert transformation. However, the arrangement of a target which produces an echo at a known distance has various disadvantages. Firstly, this target can be concealed by people or objects moving in the area. Secondly, raindrops, snow or ice in the measurement path or on the radome housing in which the radar rangefinder is arranged can adversely affect the calibration. On the other hand, it is desirable for the calibration distance to be as great as possible in order to keep the calibration measurement error as small as possible.

Against this background, the object of the present invention is to specify a radar rangefinder having a reflector for calibration, in which the disturbance influences mentioned above are all precluded.

This object is achieved according to the distinguishing features of patent claim 1. Further advantageous refinements of the radar rangefinder according to the invention can be found in the dependent claims.

The invention will be described in more detail in the following text with reference to an exemplary embodiment which is illustrated in the figures of the attached drawing, in which:

DETAILED DESCRIPTION OF THE INVENTION

Figure 1:
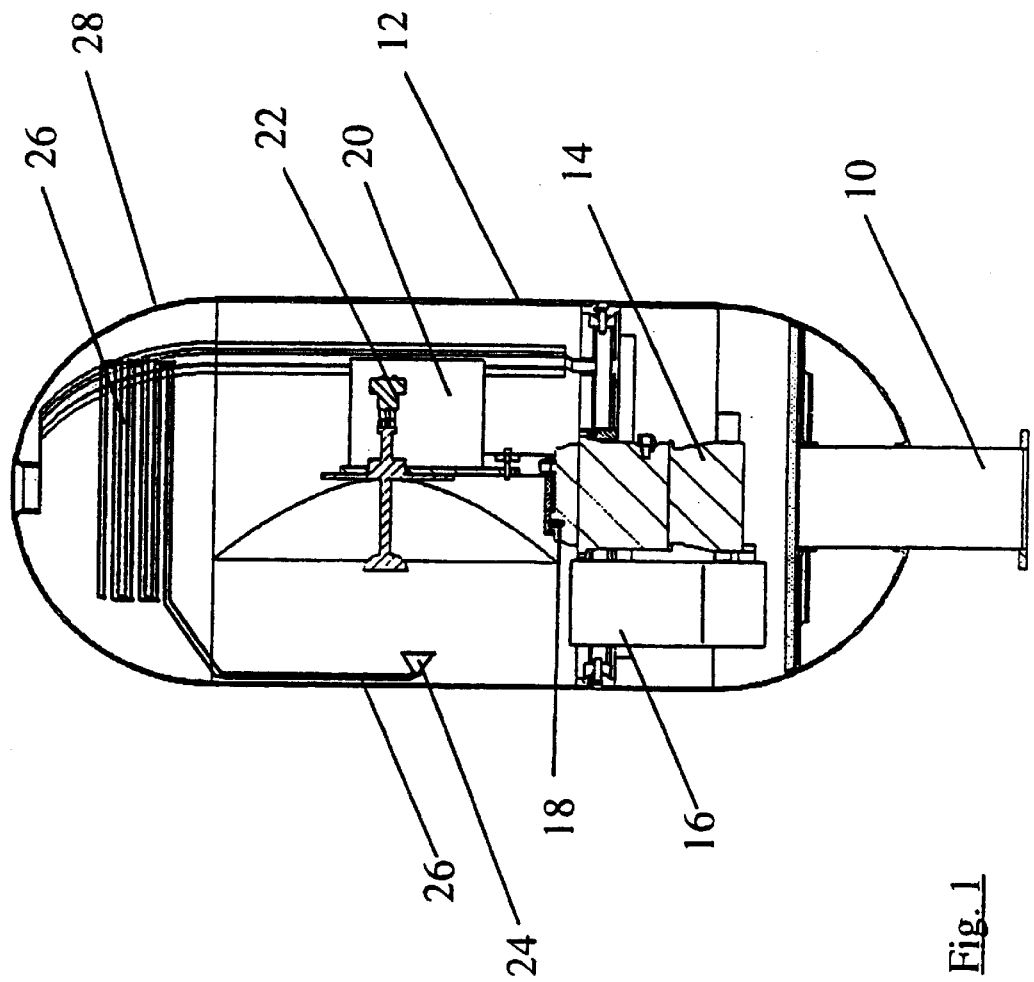
FIG. 1 shows the principle of the design of the radar rangefinder according to the present invention.

According to FIG. 1, a fixed-position basic unit 14 with associated electronics 16 and a rotating platform 18 is arranged in a protective cover 12, which is arranged on a base 10 and is referred to in the following text as a radome housing, and the rotating platform 18 is fitted with a radar transmitting/receiving antenna 22 with associated electronics 20. A horn antenna 24 is arranged inside the radome housing 12 such that, when the transmitting/receiving antenna 22 rotates through 360°, the horn antenna 24 is painted in an angle region which is located outside the danger area monitored by the transmitting/receiving antenna 22. A patch antenna could also be used instead of a horn antenna. The transmitting/receiving antenna 22 may also be rotated to a position where it faces the horn antenna 24, for calibration. A delay line 26 is connected to the horn antenna 24 and is short-circuited at its end, dictating a specific shortening factor. Thus, for example, a delay line 26 with a length of about 8 m corresponds to an electrical length of 20 m, so that this results in conditions as if the target which produces the echo were arranged at a distance of 20 m. The delay line 26 is routed upward into the dome 28 of the radome housing 12, where it is wound up in turns. The delay line 26 may be formed by a round waveguide or a rectangular waveguide.

Figure 2:
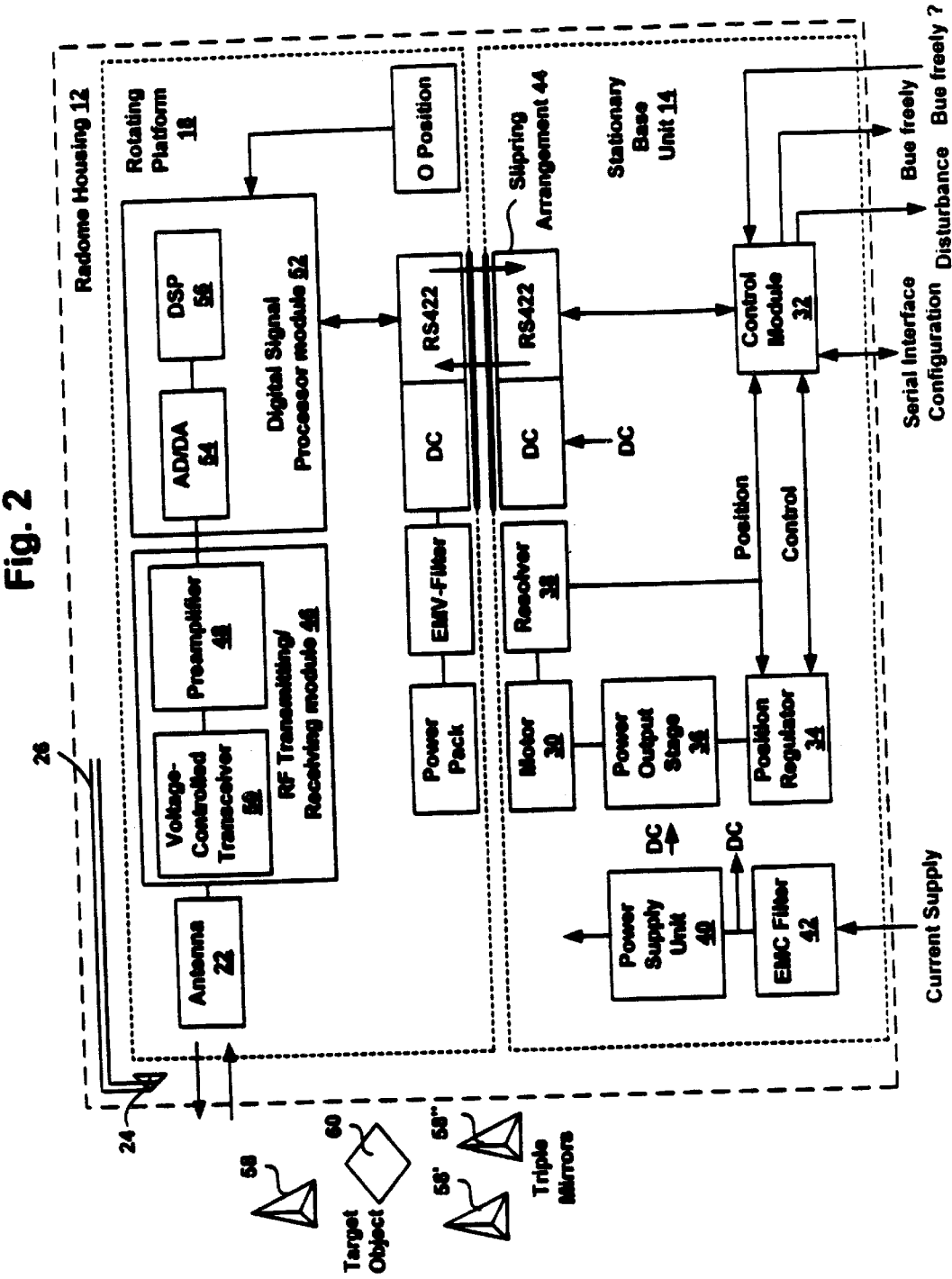
FIGS. 2 and 3 show a block diagram of the components used in the radar rangefinder shown in FIG. 1.
Figure 3:
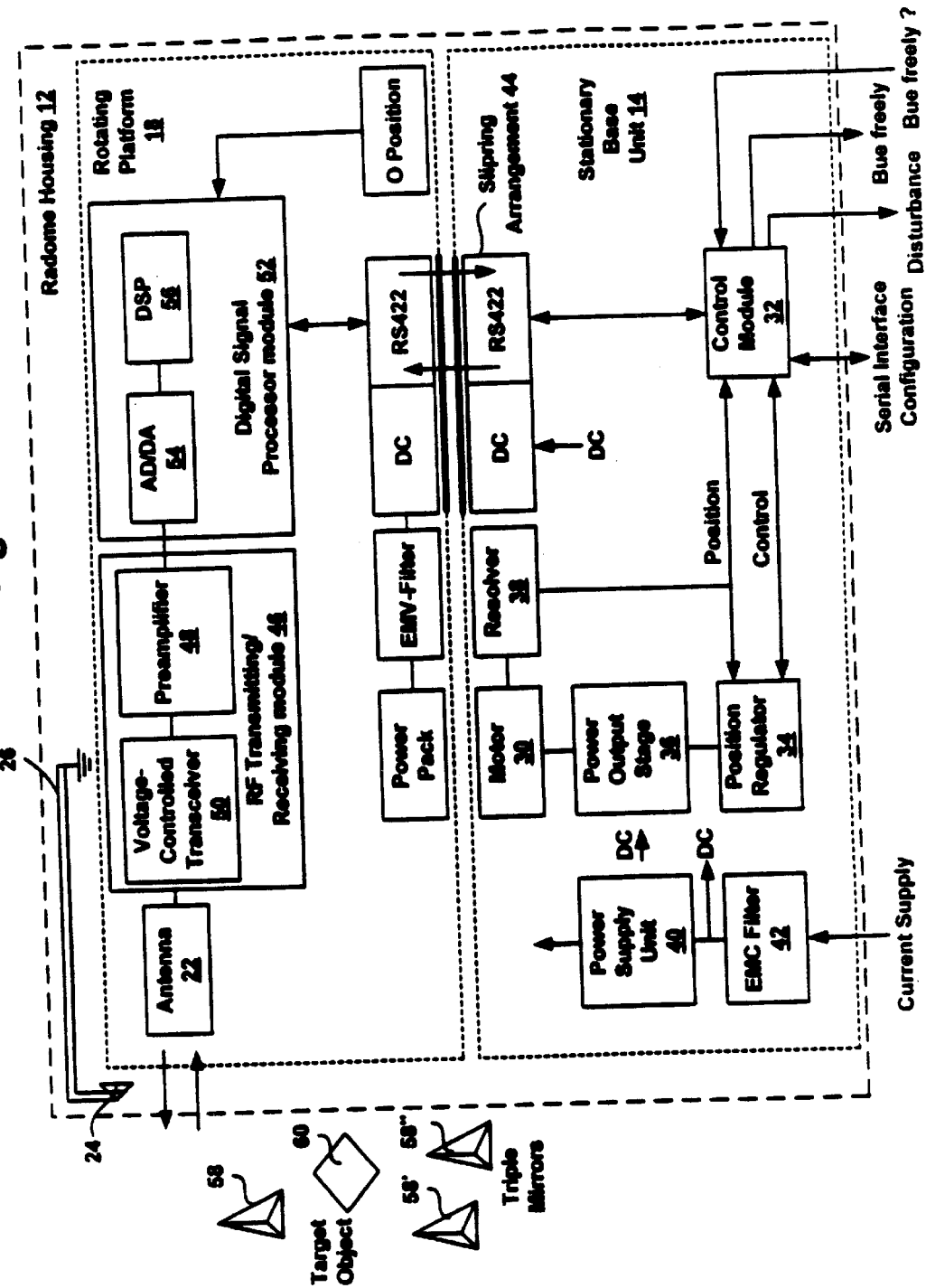

FIGS. 2 and 3 show those components which are located inside the radome housing 12 on the stationary base unit 14 and the rotating platform 18. FIG. 2 shows the end of the delay line 26 short circuited while FIG. 3 shows the end of the delay line 26 open-circuited.

The rotating platform 18 is driven by a motor 30, which is driven by a control module 32 via a position regulator 34 and a power output stage 36. A resolver 38 forms an actual value signal for the position regulator 34. A power supply unit 40, which is connected to the power supply via an EMC filter 42, supplies the required regulated DC voltage. The voltage supply for the rotating platform 18 as well as a communications interface for incoming and outgoing data are provided via a slipring arrangement 44.

The rotating platform 18 is fitted with the transmitting/receiving antenna 22, an RF transmitting/receiving module 46, which has a preamplifier 48 and a voltage-controlled transceiver 50, as well as a digital signal processor module 52, which comprises an A/D and D/A converter 54 and the actual signal processor 56.

The danger area to be monitored is bounded by three triple mirrors 58, 58', 58", and a target object 60 is to be detected in this area. The horn antenna 24 and the delay line 26 are arranged on the inner wall inside the radome housing 12.

What is claimed is:

1. A radar rangefinder comprising: a transmitting/receiving antenna arranged on a rotating platform for monitoring a danger area, a radome housing for accommodating the transmitting/receiving antenna, and a reflector arranged at a known distance in order to preset a calibration for the rangefinder, wherein:

a) the reflector is provided by an auxiliary antenna, which is likewise arranged in the radome housing;
   b) the auxiliary antenna is coupled to a delay line, the delay line having a shortening factor, an actual length, a virtual length, and an end, the end of the delay line being coupled to the housing;
   c) the delay line is arranged together with the auxiliary antenna on an inner wall of the radome housing; and
   d) the virtual length of the delay line is greater than the actual length of the delay line.

2. The radar rangefinder as claimed in claim 1, wherein the auxiliary antenna is arranged in an angle region outside the measurement range.

3. The radar rangefinder as claimed in claim 2, wherein the auxiliary antenna is a horn antenna.

4. The radar rangefinder as claimed in claim 2, wherein the auxiliary antenna is a patch antenna.

5. The radar rangefinder of claim 1, wherein the transmitting/receiving antenna is moved to a position where is faces the auxiliary antenna for calibration.

6. The radar rangefinder as claimed in claim 1, wherein the calibration is carried out during rotation of the transmitting/receiving antenna.

7. The radar rangefinder as claimed in claim 1, wherein the delay line is arranged in a winding in a dome of the radome housing.

8. The radar rangefinder as claimed in claim 7, wherein the delay line is provided by means of a round waveguide with a short circuit.

9. The radar rangefinder as claimed in claim 7, wherein the delay line is provided by a rectangular waveguide with a short circuit at the end.

10. The radar rangefinder as claimed in claim 7, wherein the delay line is provided by means of a round waveguide with a open circuit.

11. The radar rangefinder as claimed in claim 7, wherein the delay line is provided by a rectangular waveguide with a open circuit at the end.

* * * * *